(12) United States Patent
Ko et al.

(10) Patent No.: US 11,066,040 B2
(45) Date of Patent: Jul. 20, 2021

(54) AIRBAG DEVICE

(71) Applicant: HYUNDAI MOBIS CO., LTD., Seoul (KR)

(72) Inventors: Seok Hoon Ko, Yongin-si (KR); Ga Ram Jeong, Yongin-si (KR); Hae Kwon Park, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 56 days.

(21) Appl. No.: 16/585,997

(22) Filed: Sep. 27, 2019

(65) Prior Publication Data

US 2020/0156587 A1 May 21, 2020

(30) Foreign Application Priority Data

Nov. 20, 2018 (KR) .......................... 10-2018-0143382

(51) Int. Cl.
| | |
|---|---|
| *B60R 21/261* | (2011.01) |
| *B60R 21/233* | (2006.01) |
| *B60R 21/2338* | (2011.01) |
| *B60R 21/00* | (2006.01) |

(52) U.S. Cl.
CPC .......... *B60R 21/261* (2013.01); *B60R 21/233* (2013.01); *B60R 21/2338* (2013.01); *B60R 2021/0048* (2013.01); *B60R 2021/23324* (2013.01); *B60R 2021/23382* (2013.01)

(58) Field of Classification Search
CPC . B60R 21/261; B60R 21/233; B60R 21/2338; B60R 2021/0048; B60R 2021/23324; B60R 2021/23382; B60R 2021/23384
See application file for complete search history.

(56) References Cited

U.S. PATENT DOCUMENTS

| | | | | |
|---|---|---|---|---|
| 5,362,101 | A * | 11/1994 | Sugiura ................. | B60R 21/233 280/728.2 |
| 5,853,191 | A * | 12/1998 | Lachat ............... | B60R 21/23138 280/730.2 |
| 8,262,130 | B2 * | 9/2012 | Fischer ................. | B60R 21/235 280/743.2 |
| 8,851,511 | B1 * | 10/2014 | Volkmann ......... | B60R 21/23138 280/730.2 |
| 9,409,542 | B2 * | 8/2016 | Fujiwara ................ | D05B 13/00 |
| 2005/0127653 | A1 * | 6/2005 | Williams ............ | B60R 21/2338 280/743.2 |
| 2008/0185827 | A1 * | 8/2008 | Webber ............. | B60R 21/01512 280/735 |
| 2014/0208567 | A1 * | 7/2014 | Hotta .................. | B60R 21/2346 29/428 |

(Continued)

*Primary Examiner* — Drew J Brown
(74) *Attorney, Agent, or Firm* — NovoTechIP International PLLC (57) ABSTRACT

Disclosed herein is an airbag device that includes an airbag cushion inflated as a working gas is introduced thereinto, a partition installed inside the airbag cushion to partition the airbag cushion into a first chamber facing an occupant's head and a second chamber adjacent to the first chamber, and a deployment adjustment section configured to pass through the partition, to interconnect the first chamber and the second chamber, and to guide deployment of the second chamber.

10 Claims, 5 Drawing Sheets

(56) References Cited

U.S. PATENT DOCUMENTS

| | | | |
|---|---|---|---|
| 2015/0183393 A1* | 7/2015 | Kino | B60R 21/233 |
| | | | 280/729 |
| 2016/0159310 A1* | 6/2016 | Kobayashi | B60R 21/26 |
| | | | 280/729 |
| 2016/0167615 A1* | 6/2016 | Hiruta | B60R 21/2342 |
| | | | 280/739 |
| 2017/0008481 A1* | 1/2017 | Hotta | B60R 21/23138 |
| 2019/0359165 A1* | 11/2019 | Kobayashi | B60R 21/2338 |

* cited by examiner

AIRBAG DEVICE

CROSS-REFERENCE TO RELATED APPLICATION

The present application claims priority under 35 U.S.C. § 119(a) to Korean Patent Application No. 10-2018-0143382, filed on Nov. 20, 2018 in the Korean Intellectual Property Office, which is incorporated herein by reference in its entirety.

BACKGROUND

1. Technical Field

Embodiments of the present disclosure relate to an airbag device, and more particularly, to an airbag device capable of reducing a possibility of injury to an occupant's head and neck during deployment of an airbag.

2. Related Art

In general, a vehicle is equipped with airbags to protect an occupant. The airbags are installed at various positions depending on the body part of the occupant. A front airbag is installed in the front of the vehicle. When an impact is applied to the vehicle, gas is injected into the front airbag. The front airbag is inflated by the gas supplied thereto and deployed toward the occupant, thereby preventing the occupant from hitting the body of the vehicle.

However, when emergency braking of the vehicle occurs, the occupant moves forward due to deceleration and approaches the airbag to be deployed so that the occupant is injured by the deployment force of the airbag. That is, the occupant's head or neck may be injured by the deployment of the airbag after the occupant's head moves forward and comes into contact with the airbag by the emergency braking of the vehicle. Therefore, it is necessary to improve this issue.

SUMMARY

Various embodiments are directed to an airbag device capable of reducing a possibility of injury to an occupant's head and neck during deployment of an airbag.

In an embodiment, there is provided an airbag device that includes an airbag cushion inflated as a working gas is introduced thereinto, a partition installed inside the airbag cushion to partition the airbag cushion into a first chamber facing an occupant's head and a second chamber adjacent to the first chamber, and a deployment adjustment section configured to pass through the partition, to interconnect the first chamber and the second chamber, and to guide deployment of the second chamber.

The airbag cushion may include a pair of cushion sides connected to the partition and facing each other, and a cushion body interconnecting the cushion sides and connected to the deployment adjustment section.

The partition may include a first partition member positioned above the deployment adjustment section and forming a film between the first chamber and the second chamber, and a second partition member positioned beneath the deployment adjustment section and forming a film between the first chamber and the second chamber.

One end of the first partition member may be fixed to the cushion body, and both widthwise sides thereof may be fixed to the cushion sides.

One end of the second partition member may be spaced apart from the first partition member, the other end thereof may be spaced apart from the cushion body, and both widthwise sides thereof may be fixed to the cushion sides.

The deployment adjustment section may include a first adjustment part configured such that one side thereof is connected to the cushion body facing the first chamber and the other side thereof is connected to the cushion body facing the second chamber, and a second adjustment part connected to both sides of the bent first adjustment part and broken by an external force for inflating the first chamber.

The first adjustment part may have a string or strip shape.

The second adjustment part may include a first body connected to one side of the first adjustment part, a second body connected to the other side of the first adjustment part, and a breaking portion interconnecting the first body and the second body and broken by an external force.

The breaking portion may have a width smaller than the first and second bodies.

The first adjustment part between the first body and the second body may be installed in a bent state.

As apparent from the above description, in the airbag device according to the present invention, since the first chamber facing the occupant's head is inflated after the second chamber is inflated by the installation of the partition, it is possible to reduce the impact caused when the occupant's head moves forward and comes into contact with the airbag by the emergency braking of the vehicle.

According to the present invention, even when the occupant is close to the airbag during the emergency braking of the vehicle, it is possible to reduce the impact applied to the occupant's neck and head since the first chamber facing the occupant's head is inflated after the second chamber is inflated.

According to the present invention, since the first chamber facing the occupant's head is inflated after the second chamber is inflated until the second adjustment part is broken, it is possible to reduce the impact applied to the occupant's neck and head.

DETAILED DESCRIPTION

Hereinafter, an airbag device according to exemplary embodiments of the present invention will be described below in detail with reference to the accompanying drawings through various examples of embodiments. It should be noted that the drawings are not necessarily to scale and may be exaggerated in thickness of lines or sizes of components for clarity and convenience of description.

Furthermore, the terms as used herein are terms defined in consideration of functions of the invention and may change depending on the intention or practice of a user or an operator. Therefore, these terms should be defined based on the overall disclosures set forth herein.

Figure 1:
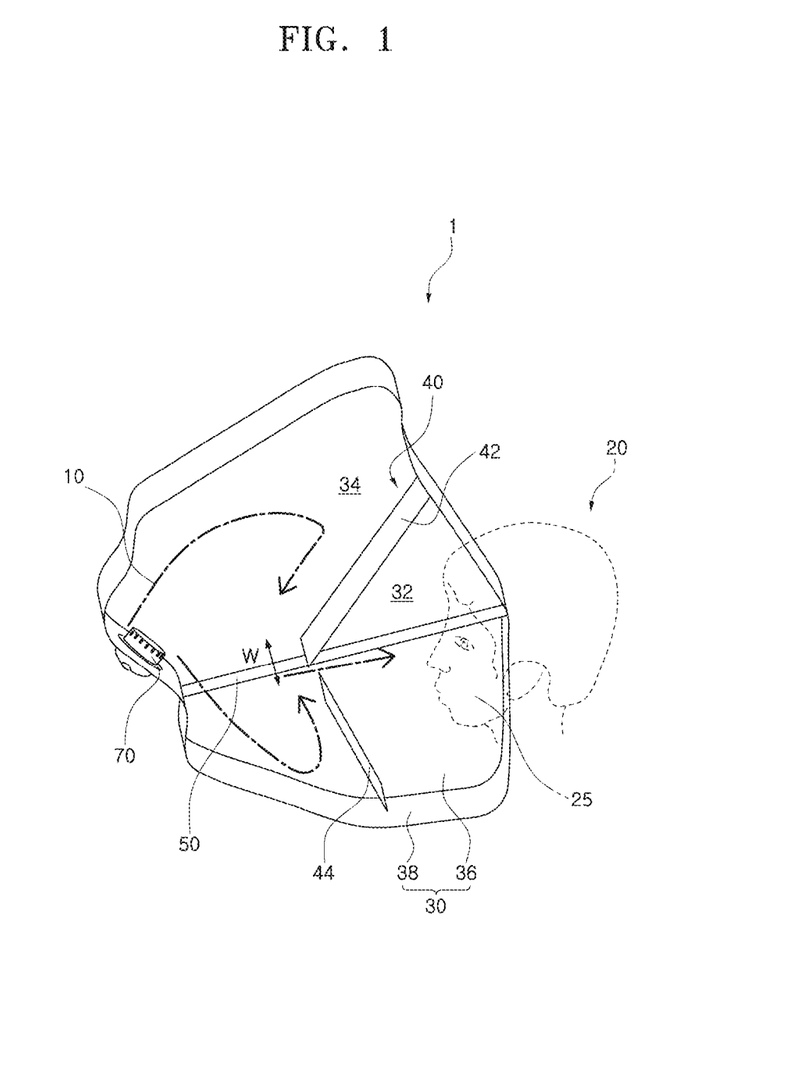
FIG. 1 is a perspective view schematically illustrating an airbag device according to an embodiment of the present invention.
Figure 2:
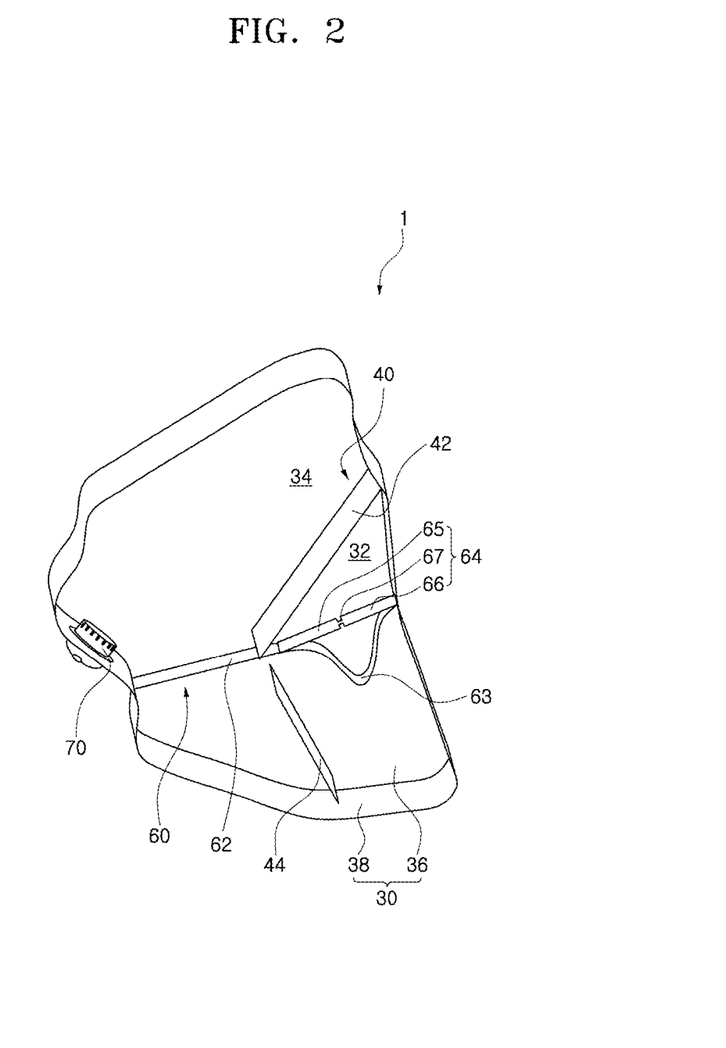
FIG. 2 is a perspective view illustrating a state in which first and second adjustment parts are installed in the airbag device according to the embodiment of the present invention.
Figure 3:
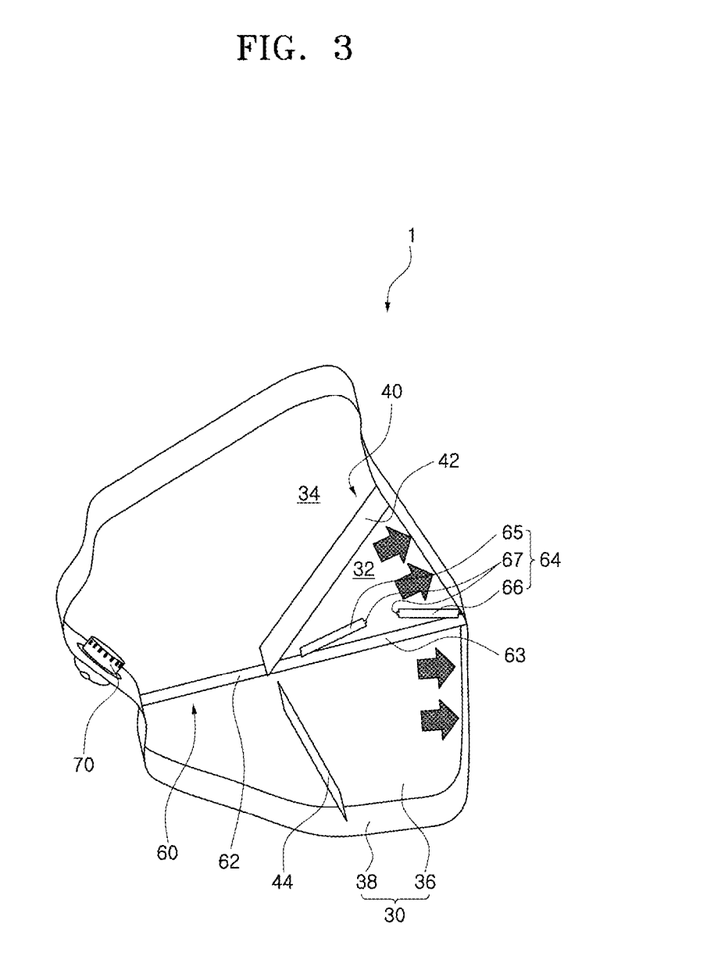
FIG. 3 is a perspective view illustrating a state in which the second adjustment part according to the embodiment of the present invention is broken.
Figure 4:
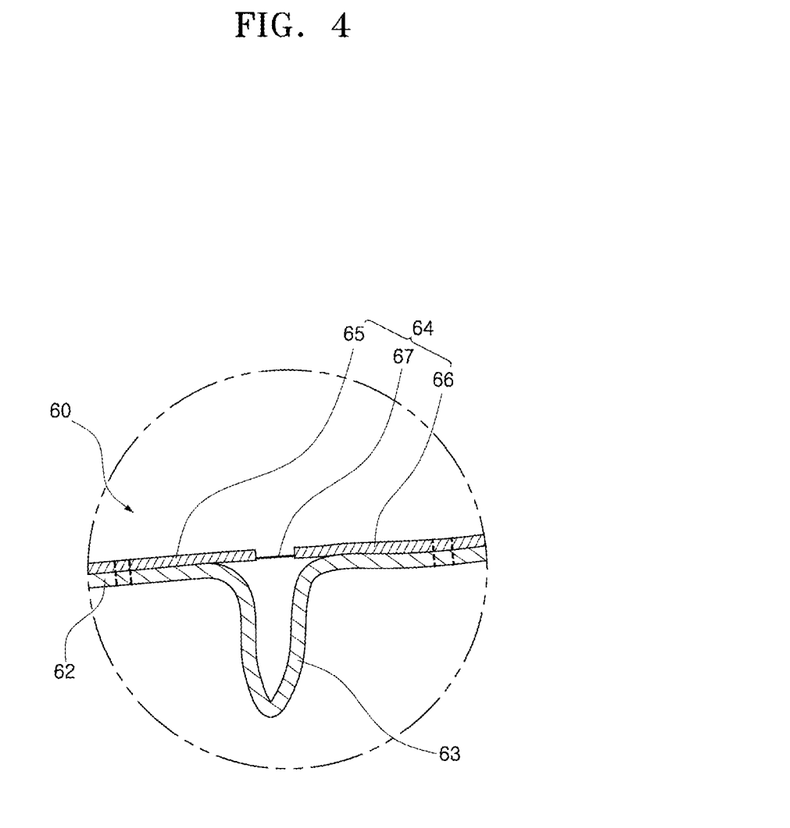
FIG. 4 is a cross-sectional view illustrating the first and second adjustment parts in the airbag device according to the embodiment of the present invention.
Figure 5:
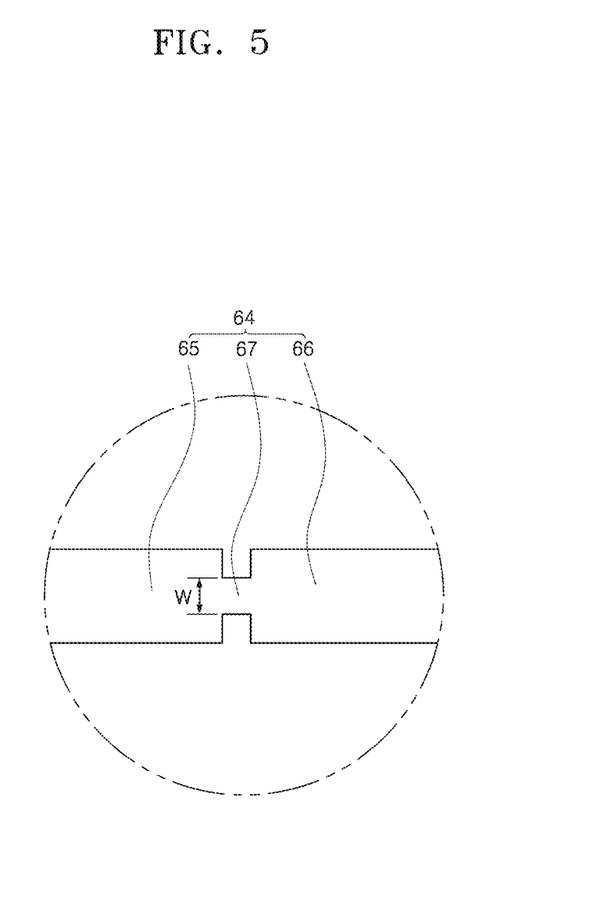
FIG. 5 is a top view illustrating the second adjustment part according to the embodiment of the present invention.

FIG. 1 is a perspective view schematically illustrating an airbag device according to an embodiment of the present invention. FIG. 2 is a perspective view illustrating a state in which first and second adjustment parts are installed in the airbag device according to the embodiment of the present invention. FIG. 3 is a perspective view illustrating a state in which the second adjustment part according to the embodiment of the present invention is broken. FIG. 4 is a cross-sectional view illustrating the first and second adjustment parts in the airbag device according to the embodiment of the present invention. FIG. 5 is a top view illustrating the second adjustment part according to the embodiment of the present invention.

As illustrated in FIGS. 1 to 5, the airbag device, which is designated by reference numeral 1, according to the embodiment of the present invention includes an airbag cushion 30 inflated as a working gas 10 is introduced thereinto, a partition 40 installed inside the airbag cushion 30 to partition the airbag cushion 30 into a first chamber 32 facing a head 25 of an occupant 20 and a second chamber 34 adjacent to the first chamber 32, and a deployment adjustment section 50 or 60 that passes through the partition 40, interconnects the first chamber 32 and the second chamber 34, and guides the deployment of the second chamber 34.

The airbag device 1 according to the embodiment of the present invention is a passenger airbag, and the partition 40, which is a diaphragm for partitioning the airbag cushion 30, is installed inside the airbag cushion 30. Thus, the internal pressure of the first chamber 32, which interferes with the passenger's head 25 during the deployment of the airbag cushion 30, is regulated to increase late. In addition, a second adjustment part 64 interconnects both sides of a first adjustment part 62 installed in a bent state in the first chamber 32, and has a tether shape that is broken by a predetermined external force.

The first adjustment part 62 includes a first bent portion 63 installed in a bent shape in the first chamber 32. Since both sides of the second adjustment part 64 are connected to both sides of the bent portion 63, the initial inflation length of the first chamber 32 is proportional to the length of the second adjustment part 64. After the second adjustment part 64 is broken, the later inflation length of the first chamber 32 is proportional to the length of the bent portion 63.

Thus, the airbag cushion 30 is restricted from protruding toward the head 25 of the occupant 20 until the pressure in the first chamber 32 reaches a predetermined pressure or more.

The airbag cushion 30 according to the embodiment of the present invention is partitioned into the first chamber 32 facing the occupant 20 and the second chamber 34 installed toward a connection passage 70 which is a passage through which the working gas 10 of an inflator is introduced. The working gas 10 introduced into the airbag cushion 30 through the connection passage 70 fills the second chamber 34, which does not touch the head 25 of the occupant 20, and then fills the first chamber 32 which touches the head 25 of the occupant 20.

The working gas 10 flows from the second chamber 34 to the first chamber 32 through an empty space between diaphragm structures between the chambers. In this case, one side of the deployment adjustment section 50 or 60 is connected to the inside of the second chamber 34 connected to the connection passage 70, and the other side of the deployment adjustment section 50 or 60 is connected to the inside of the first chamber 32.

The second adjustment part 64 provided in the deployment adjustment section 60 is structured to be broken when a certain load is applied thereto. Thus, the second adjustment part 64 may be set to have two lengths before and after it is broken.

The protruding of the first chamber 32 is restricted by the deployment adjustment section 60 until the pressure in the first chamber 32 reaches a predetermined pressure, and the protruding of the first chamber 32 increases while the second adjustment part 64 is broken by the force for inflating the first chamber 32. The protruding of the first chamber 32 is restricted by the first and second adjustment parts 62 and 64 of the deployment adjustment section 60.

The airbag cushion 30 may have various shapes within the technical idea of being inflated by the introduction of the working gas 10. According to an embodiment, the airbag cushion 30 includes a pair of cushion sides 36 and a cushion body 38, and is partitioned into the first chamber 32 and the second chamber 34 by the partition 40.

The cushion sides 36 are connected to the partition 40 and installed to face each other. According to an embodiment, the cushion sides 36 are installed in parallel to each other with the partition 40 interposed therebetween, and each have a film shape extending vertically.

The cushion body 38 interconnects the cushion sides 36 and is connected to the deployment adjustment section 50 or 60. According to an embodiment, the cushion body 38 is positioned between the cushion sides 36 and has a film shape interconnecting the cushion sides 36.

The partition 40 is installed inside the airbag cushion 30, and may have various shapes within the technical idea of partitioning the airbag cushion 30 into the first chamber 32 facing the head 25 of the occupant 20 and the second chamber 34 adjacent to the first chamber 32.

According to an embodiment, the partition 40 includes a first partition member 42 that is positioned above the deployment adjustment section 50 or 60 and forms a film between the first chamber 32 and the second chamber 34, and a second partition member 44 that is positioned beneath the deployment adjustment section 50 or 60 and forms a film between the first chamber 32 and the second chamber 34.

According to an embodiment, one end (top in FIG. 1) of the first partition member 42 is fixed to the cushion body 38, and both sides thereof in the width direction W are fixed to the cushion sides 36. The first partition member 42 has a film shape and partitions the airbag cushion into the first chamber 32 and the second chamber 34 above the deployment adjustment section 50 or 60.

According to an embodiment, one end (top in FIG. 1) of the second partition member 44 is spaced apart from the first partition member 42 and the other end (bottom in FIG. 1) thereof is spaced apart from the cushion body 38. Both sides of the second partition member 44 in the width direction W are fixed to the cushion sides 36. The second partition member 44 has a film shape and partitions the airbag cushion into the first chamber 32 and the second chamber 34 beneath the deployment adjustment section 50 or 60.

The airbag cushion 30 is partitioned into two chambers by the partition 40 having a diaphragm shape. In this case, the second chamber 34 refers to a chamber located in the installation direction of the inflator, and the first chamber 32 refers to a chamber located toward the occupant 20.

The diaphragm for partitioning the airbag cushion into the first chamber 32 and the second chamber 34 includes the first partition member 42 and the second partition member 44. A space is present between the first and second partition members 42 and 44 facing each other so that the working gas 10 in the second chamber 34 may flow to the first chamber 32.

As occasion demands, the upper portion of the first partition member 42 may be installed to be separated from or in contact with the cushion body 38 and the lower portion of the second partition member 44 may be installed to be separated from or in contact with the cushion body 38.

The deployment adjustment section 50 or 60 may pass through the partition 40, interconnect the first and second chambers 32 and 34, and be modified in various manners within the technical idea of guiding the deployment of the second chamber 34.

The deployment adjustment section 50 or 60, which is a tether for controlling the protruding of the first chamber 32 in the airbag cushion 30, is connected to the cushion body 38 located forward through a gas flow space defined between the first partition member 42 as an upper diaphragm and the second partition member 44 as a lower diaphragm. By the installation of the partition 40, the working gas 10 produced by the inflator fills the second chamber 34 and then fills the first chamber 32.

Since the deployment of the airbag cushion 30 delays the interference between the second chamber 34 and the head 25 of the occupant 20 and reduces the internal pressure of the first chamber 32, the head 25 of the occupant 20 is prevented from being injured by the deployed airbag cushion 30 during the deployment of the airbag cushion 30.

The deployment adjustment section 50 may be a single strip member, and may also function as the deployment adjustment section 60 that adjusts the deployment rate of the first chamber 32 by interconnecting two strip members having different lengths.

According to an embodiment, the deployment adjustment section 60 includes the first adjustment part 62 configured such that one side thereof is connected to the cushion body 38 facing the first chamber 32 and the other side thereof is connected to the cushion body 38 facing the second chamber 34, and the second adjustment part 64 that is connected to both sides of the bent first adjustment part 62 and broken by the external force for inflating the first chamber 32.

The first adjustment part 62 has a string or strip shape, and the bent portion 63 where the first adjustment part 62 is bent is located in a section connected with the second adjustment part 64.

The second adjustment part 64 includes a first body 65 connected to one side of the first adjustment part 62, a second body 66 connected to the other side of the first adjustment part 62, and a breaking portion 67 that interconnects the first and second bodies 65 and 66 and is broken by an external force. Since the first adjustment part 62 between the first body 65 and the second body 66 is installed in a bent state, the bent portion 63 is unfolded and the entire length of the first adjustment part 62 increases when the breaking portion 67 is broken.

The breaking portion 67 has a width smaller than the first and second bodies 65 and 66, so that the breaking portion 67 is broken when a predetermined force is applied thereto. That is, since the length of the breaking portion 67 in the width direction W is smaller than the lengths of the first and second bodies 65 and 66 in the width direction W, the breaking portion 67 is broken when an external force is applied thereto.

When the deployment adjustment section 60 includes the first and second adjustment parts 62 and 64 having two lengths, the first adjustment part 62 interconnects the first and second chambers 32 and 34.

The first adjustment part 62 serves to control the protruding of the airbag cushion 30 toward the head 25. In order to further reduce the interference between the occupant 20 and the first chamber 32, the initial length of the first adjustment part 62 is formed to be short, the second adjustment part 64 is broken by the force when the internal pressure of the first chamber 32 increases, and the entire length of the first adjustment part 62 is formed to be longer than the initial length thereof.

The deployment adjustment section 60 is configured such that the first and second adjustment parts 62 and 64 as tethers having different lengths are overlapped with each other. The breaking portion 67 is formed at the second adjustment part 64 as a tether having a short length, and the length of the breaking portion 67 in the width direction W is small such that the breaking portion is broken when a large force is applied to both ends of the second adjustment part 64.

The first adjustment part 62 as a tether having a long length is folded at the bent portion 63 at normal times. When the second adjustment part 64 as a tether having a length shorter than the first adjustment part 62 is broken, the first adjustment part 62 is unfolded and serves as a length limiter to limit the inflation of the first chamber 32.

Meanwhile, it is possible to determine a timing, at which the first chamber 32 further protrudes, by adjusting the gas hole formed between the first partition member 42 and the second partition member 44 and the width of the breaking portion 67. It is necessary to change a time, at which the first chamber 32 protrudes, depending on the vehicle condition. To this end, it is possible to control an amount of the working gas 10 introduced into the first chamber 32 by adjusting the distance between the first partition member 42 and the second partition member 44. Alternatively, it is possible to control a timing, at which the first chamber 32 further protrudes, by adjusting the width of the breaking portion 67 of the second adjustment part 64.

In addition, although the present invention is provided to restrict the protruding of the first chamber 32 during the deployment of the airbag cushion 30, it is possible to achieve the same performance as an existing airbag since the protruding of the first chamber is not overly restricted after the airbag cushion 30 is fully deployed.

Hereinafter, the operation of the airbag device 1 according to the embodiment of the present invention will be described in detail with reference to the accompanying drawings.

As illustrated in FIG. 1, the working gas 10 introduced into the airbag cushion 30 through the connection passage 70 fills the inside of the second chamber 34 to inflate the second chamber 34. In addition, some of the gas flows to the first chamber 32 through the space defined between the first partition member 42 and the second partition member 44 to inflate the first chamber 32.

Some of the working gas 10 inflating the second chamber 34 may flow to the bottom of the second partition member 44 and to the space between the second partition member 44 and the cushion body 38, to inflate the first chamber 32. In this case, the deployment adjustment section 50 does not further control the inflation of the first chamber 32 since it has a single strip shape.

As illustrated in FIGS. 2 to 5, the working gas 10 introduced into the airbag cushion 30 through the connection passage 70 fills the inside of the second chamber 34 to inflate the second chamber 34. In addition, some of the gas flows to the first chamber 32 through the space defined between the first partition member 42 and the second partition member 44 to inflate the first chamber 32.

Thus, the first chamber 32 is inflated after the second chamber 34 is inflated. Since the breaking portion 67 is broken by the working gas 10 inflating the first chamber 32, the bent portion 63 is unfolded and the length of the first adjustment part 62 increases.

Thus, since the first chamber 32 is further inflated, it is possible to prevent injury caused when the head 25 of the occupant 20 comes into contact with the first chamber 32 in advance.

As described above, according to the present invention, since the first chamber 32 facing the head 25 of the occupant 20 is inflated after the second chamber 34 is inflated by the installation of the partition 40, it is possible to reduce the impact caused when the head 25 of the occupant 20 moves forward and comes into contact with the airbag by the emergency braking of the vehicle. In addition, even when the occupant 20 is close to the airbag during the emergency braking of the vehicle, it is possible to reduce the impact applied to the neck and head of the occupant 20 since the first chamber 32 facing the head of the occupant 20 is inflated after the second chamber 34 is inflated. Furthermore, since the first chamber 32 facing the head 25 of the occupant 20 is inflated after the second chamber 34 is inflated until the second adjustment part 64 is broken, it is possible to reduce the impact applied to the neck and the head 25 of the occupant 20.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:

1. An airbag device comprising:
    an airbag cushion surrounding an inner space and configured to inflate when a gas is introduced to the inner space;
    a partition positioned inside the airbag cushion and laterally partitioning the inner space into first and second chambers, wherein the first chamber is positioned closer to an occupant's head than the second chamber is; and
    a deployment adjustment section extending between the first and second chambers through the partition and configured to guide deployment of the second chamber when the airbag cushion inflates.

2. The airbag device according to claim 1, wherein the airbag cushion comprises:
    a pair of cushion sides connected to the partition and facing each other; and
    a cushion body extending between the pair of cushion sides and connected to the deployment adjustment section.

3. An airbag device comprising:
    an airbag cushion surrounding an inner space and configured to inflate when a gas is introduced to the inner space;
    a partition positioned inside the airbag cushion and laterally partitioning the inner space into first and second chambers, wherein the first chamber is positioned closer to an occupant's head than the second chamber is; and
    a deployment adjustment section extending between the first and second chambers through the partition and configured to guide deployment of the second chamber when the airbag cushion inflates,
    wherein the airbag cushion comprises:
        a pair of cushion sides connected to the partition and facing each other; and
        a cushion body extending between the pair of the cushion sides and connected to the deployment adjustment section, and
    wherein the partition comprises:
        a first partition member positioned above the deployment adjustment section and forming a film between the first chamber and the second chamber; and
        a second partition member positioned beneath the deployment adjustment section and forming a film between the first chamber and the second chamber.

4. The airbag device according to claim 3, wherein one end of the first partition member is fixed to the cushion body, and both widthwise sides thereof are fixed to the cushion sides.

5. The airbag device according to claim 3, wherein one end of the second partition member is spaced apart from the first partition member, the other end thereof is spaced apart from the cushion body, and both widthwise sides thereof are fixed to the cushion sides.

6. The airbag comprising:
    an airbag cushion surrounding an inner space and configured to inflate when a gas is introduced to the inner space;
    a partition positioned inside the airbag cushion and laterally partitioning the inner space into first and second chambers, wherein the first chamber is positioned closer to an occupant's head than the second chamber is; and
    a deployment adjustment section extending between the first and second chambers through the partition and configured to guide deployment of the second chamber when the airbag cushion inflates,
    wherein the airbag cushion comprises:
        a pair of cushion sides connected to the partition and facing each other; and
        a cushion body extending between the pair of the cushion sides and connected to the deployment adjustment section, and
    wherein the deployment adjustment section comprises:
        a first adjustment part configured such that one side thereof is connected to the cushion body facing the first chamber and the other side thereof is connected to the cushion body facing the second chamber; and
        a second adjustment part connected to both sides of the first adjustment part and configured to be broken when the first chamber inflates.

7. The airbag device according to claim 6, wherein the first adjustment part has a string or strip shape.

8. The airbag device according to claim 6, wherein the second adjustment part comprises:
    a first body connected to one side of the first adjustment part;
    a second body connected to the other side of the first adjustment part; and
    a breaking portion interconnecting the first body and the second body and broken by an external force.

9. The airbag device according to claim 8, wherein the breaking portion has a width smaller than the first and second bodies.

10. The airbag device according to claim 8, wherein the first adjustment part between the first body and the second body is installed in a bent state.

\* \* \* \* \*